United States Patent

Romero et al.

[11] Patent Number: 5,186,472
[45] Date of Patent: Feb. 16, 1993

[54] UNITIZED RADIAL SHAFT SEAL

[75] Inventors: Richard A. Romero, Farmington Hills, Mich.; Jesus Bengoa, Durango, Spain

[73] Assignee: Federal-Mogul Corporation, Southfield, Mich.

[21] Appl. No.: 720,343

[22] Filed: Jun. 25, 1991

[51] Int. Cl.$^5$ ............................................. F16J 15/34
[52] U.S. Cl. .................................. 277/37; 277/38; 277/53; 277/152; 277/153
[58] Field of Search ................ 277/37, 38, 53, 152, 277/153, 1, 9; 384/477, 486, 487

[56] References Cited

U.S. PATENT DOCUMENTS

| | | | |
|---|---|---|---|
| 2,336,323 | 12/1943 | Warren | 277/53 X |
| 3,339,933 | 9/1967 | Foster | 277/53 |
| 3,341,265 | 9/1967 | Paterson | 384/486 |
| 3,823,950 | 7/1974 | Pedersen | 277/53 X |
| 4,049,281 | 9/1977 | Bainard | 277/37 X |
| 4,402,515 | 9/1983 | Malott | 277/53 |
| 4,448,426 | 5/1984 | Jackowski et al. | 277/153 X |
| 4,643,436 | 2/1987 | Jackowski | 277/1 |
| 4,936,591 | 6/1990 | Romero | 277/37 X |
| 5,004,248 | 4/1991 | Messenger et al. | 277/37 |
| 5,129,744 | 7/1992 | Otto et al. | 277/152 X |

Primary Examiner—William A. Cuchlinski, Jr.
Assistant Examiner—James K. Folker
Attorney, Agent, or Firm—Lawrence J. Shurupoff

[57] ABSTRACT

A unitized seal includes a first seal casing having a radially-extending unitizing flange and a second seal casing having an annular elastomeric bumper. The bumper has an engagement surface which confronts the unitizing flange for engagement therewith. Upon installation of the seal, the unitizing flange compresses the bumper. Upon initial rotation of the seal, the unitizing flange slices into the bumper so as to form a labyrinth-type seal. This arrangement reduces running torque and seal lip temperature.

2 Claims, 1 Drawing Sheet

UNITIZED RADIAL SHAFT SEAL

BACKGROUND OF THE INVENTION

1. Technical Field

The present invention relates to radial lip seals and more particularly relates to a two-part seal assembly which seals fluids between two relatively rotatable machine elements.

2. Brief Description of the Background Art

Radial lip oil seals are used in numerous rotating machine applications including wheel hubs, shaft journals and anti-friction bearings. A particular form of a radial lip oil seal known as a unitized oil seal is preferred in certain applications because it protects the seal lips and minimizes the need for finishing the surfaces sealed by the unitized seal. A typical unitized radial lip seal includes relatively rotatable inner and outer metal elements or casings upon which elastomeric seal lips may be formed.

Unitized seals are often installed as a unit within a bore in a wheel hub. The wheel hub is then mounted over an axle around which the seal lip forms an annular sealing barrier. This mounting assembly generally involves some relative axial shifting of the inner and outer unitized seal elements. As the seal elements are axially shifted during installation, a significant axial load may be applied to the seal and may result in metal-to-metal, metal-to-rubber, and/or rubber-to-rubber contact between the inner and outer elements.

The large axial loads generated between the inner and outer seal elements during installation can bring about the formation of metal chips as the unitized seal is initially rotated and "broken-in." These metal chips can migrate beneath the seal lips causing abrasions and cuts in the lips and eventual seal failure. Such metal-to-metal contact can thereby reduce seal life and cause an increase in torque required to rotate the seal as the inner and outer metal elements rub against one another with significant friction.

In order to prevent metal-to-metal contact, prior unitized seals have used axially-extending elastomeric bumpers or nibs for axially spacing the inner seal element from the outer seal element. However, upon mounting the unitized seal within a housing bore and over a shaft, the axially-directed mounting forces axially compress the bumpers and nibs between the inner and outer sealing elements. During the initial break-in period of the unitized seal, the nibs or bumpers on one seal element must be worn away to eventually provide clearance or minimal contact between the bumpers and a locating surface on the other seal element.

During the break-in period, the rubber nibs or bumpers generate significant resistance to rotation between the inner and outer sealing elements. This resistance must be overcome by increasing the torque applied between the sealing elements. Clearly, this increased resistance is undesirable from an efficiency viewpoint as energy is required to overcome the friction generated by the abrasion of the bumpers and nibs. Moreover, the heat generated by the friction can adversely affect the seal lip materials and the abraded rubber can cause at least temporary seal leakage as the abraded rubber particles work their way under the seal lips.

Because the nibs are initially compressed during installation, they subsequently expand axially during break-in thereby prolonging the time during which start-up torque must be increased to generate relative rotation between the shaft and bore being sealed. That is, as the nibs are worn away, they still maintain contact with the other seal element as they axially expand to relieve their compression. This prolongs the break-in period.

One example of a unitized oil seal design is shown in U.S. Pat. No. 4,936,591 to Romero which discloses the concept of providing a unitized seal with a first seal casing having a plastically deformable radially-extending unitizing flange and a second seal casing having at least one axially-extending projection. The projection has an engagement surface which confronts the unitizing flange for engagement therewith. Upon installation of the seal, the projection axially deforms the unitizing flange in a localized area about the projection. Upon initial rotation of the seal, the projection further axially deforms the remainder of the unitizing flange within the first few rotations.

Although this arrangement reduces the production of metal chips and/or abraded elastomeric particles during seal break-in and further reduces the resistance to seal rotation during break-in, the formation of the thin deformable unitizing flange has proved difficult to carry out in large production runs. That is, the tolerances on the unitizing flange must be accurately controlled in order to provide the desired axial strength and limited deformation desired during installation. This has presented problems during manufacturing of the first seal casing. Moreover, even though this prior design reduces the formation of metal chips as compared to other known seal designs, the engagement between the unitizing flange and the axial projection could produce, on occasion, an unwanted metal chip.

Accordingly, a need exists for an easily manufactured unitized seal which further reduces or eliminates the formation of abraded metal and/or rubber particles during break-in. A further need exists for a unitized oil seal which minimizes its break-in period and which significantly reduces initial or "start-up" torque requirements for initially rotating the newly installed seal. Yet another need exists for a unitized oil seal which, after break-in, generates minimal resistance to rotation.

SUMMARY OF THE INVENTION

The present invention has been developed to fulfill the needs noted above and therefore has as a primary object the provision of a unitized shaft seal which reduces or eliminates the formation of rubber and/or metal chips during its break-in period. The invention is primarily intended as an improvement on U.S. Pat. No. 4,936,591.

Another object is to provide a unitized shaft seal which reduces or minimizes its break-in period.

Yet another object is to provide a unitized shaft seal which requires less torque to break-in and operate than prior unitized seals.

Still another object of the invention is to provide a unitized shaft seal which forms an additional sealing barrier during seal installation and initial seal rotation.

Yet another object of the invention is to provide a unitized shaft seal with a unitizing flange which is relatively easy to manufacture and which does not have to be dimensioned within close critical tolerances.

These objects are met by the unitized seal constructed in accordance with the present invention wherein a sharp-edged unitizing flange provided on one of the seal casings is designed to partially embed itself in an adjacent ring of elastomeric material on the other casing during installation and to further embed itself therein during initial seal operation. As the unitizing flange is rotated, it effects a slicing action into the confronting annular elastomeric surface so as to avoid abrading the elastomer and so as to form an additional labyrinth-type sealing barrier therewith.

As the seal is installed, the unitizing flange transfers the axially-directed installation force to the annulus of elastomeric material molded to the adjoining portion of the other seal casing. When the newly installed seal is initially rotated, the unitizing flange shears or slices a circular slit through the elastomer. In this manner, a continuous 360° sealing barrier may be formed during installation and during the first rotations of the seal as the tip of the unitizing flange becomes embedded within the elastomer.

Because of the manner in which the elastomer is sheared or sliced, little, if any, elastomeric particles are able to reach the primary seal lip. Moreover, because no metal-to-metal contact is made, no metal chips may form. As the unitizing flange rotates, the surrounding elastomeric material forms a pair of closely-spaced sealing surfaces on opposite sides of the unitizing flange in the manner of a labyrinth seal. After a short break-in period, the resistance to rotation between the unitizing flange and the surrounding elastomeric material becomes quite low and thereby provides a low torque unitized seal with a supplemental labyrinth seal formed by a cutting or slicing operation.

BRIEF DESCRIPTION OF THE DRAWINGS

Various other objects, features and attendant advantages of the present invention will be more fully appreciated from the following detailed description when considered in connection with the accompanying drawings, in which the same reference numbers designate the same or corresponding parts throughout.

FIG. 3 is a view of the seal of FIGS. 1 and 2 after installation and rotational break-in.

DETAILED DESCRIPTION OF THE PREFERRED EMBODIMENTS

Figure 1:
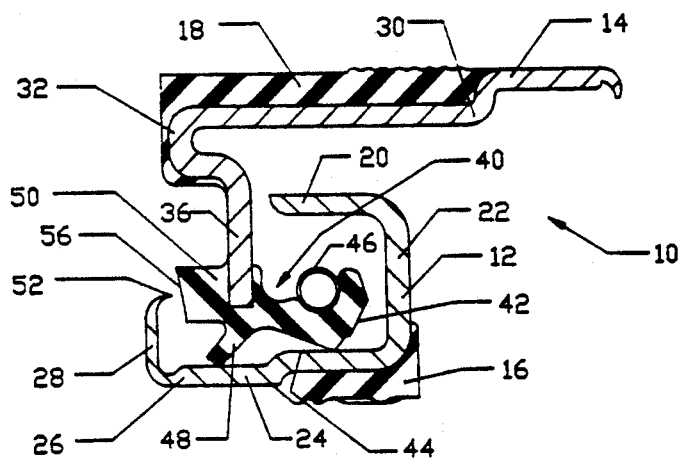
FIG. 1 is an axial cross-sectional view taken through a unitized oil bath seal constructed in accordance with the present invention and shown in its free or uninstalled state.

The present invention will now be described in conjunction with the drawings, beginning with FIG. 1, which shows a unitized seal 10 in a free, unloaded state prior to its installation within a housing bore and around a shaft. Seal 10 includes a first or inner seal casing 12 and a second or outer seal casing 14, each formed of a material such as metal. Inner casing 12 is typically installed over a shaft while outer casing 14 is typically installed within a bore formed in a housing surrounding the shaft.

The inner casing 12 may include a molded inner ring 16 of elastomeric material for forming a fluid tight seal with a shaft while the outer casing 14 may include a molded outer ring 18 of elastomeric material for forming a fluid tight seal with a bore. As further seen in FIG. 1, inner casing 12 is formed with an outer axially-extending portion 20 which leads to a radial portion 22 which extends radially inwardly into an inner radially-stepped axial portion 24. At the end 26 of inner axial portion 24, opposite radial portion 22, a radial unitizing flange 28 is formed.

The outer casing 14 is formed with an outer radially-stepped axial portion 30 which forms a radial inward reverse bend 32 which leads to a radial flange portion 36. An elastomeric seal body 40 is bonded or molded to the outer seal casing so as to cover and encapsulate flange 36.

Seal body 40 may be formed with a primary seal lip 42 which rotates and slides against the inner surface 44 of inner axial portion 24 of the inner casing 12. Primary seal lip 42 may be biased against surface 44 with a garter spring 46 in a conventional fashion. If desired, a secondary seal lip 48 may be formed on seal body 40 for excluding dirt and debris from access to primary seal lip 42. Generally, the primary seal lip 42 is exposed to the fluid being sealed while the secondary seal lip 48 is positioned between the primary lip and the ambient environment.

Figure 3:
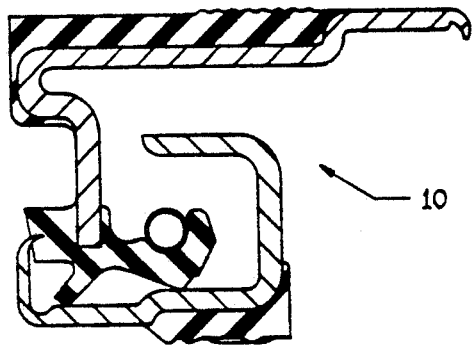

An annular bumper 50, which may be molded homogeneously with seal body 40 or separately formed and mounted, extends axially from flange 36 to engage the sharp knife-like axially-extending tip 52 of unitizing flange 28. Bumper 50 is dimensioned such that during operation of seal 10, the material of bumper 50 prevents unitizing flange 28 from making metal-to-metal contact with radial flange 36. As seen in FIG. 3, tip 52 extends axially less than does bumper 50. The invention centers around the interaction between bumpers 50 on the outer casing 14 and unitizing flange 28 on the inner casing 12.

Figure 2:
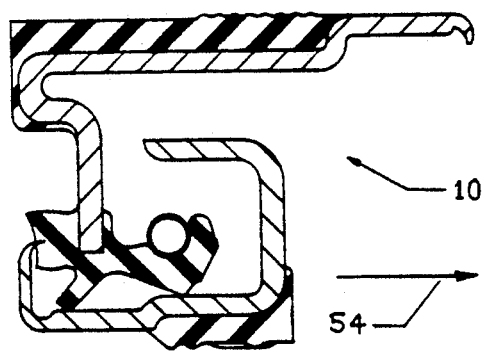
FIG. 2 is a view of the seal of FIG. 1 as it is axially loaded during installation.

Unitizing flange 28 is formed with a thin, relatively rigid cross section which is typically thinner than the cross section of the inner axial portion 26 of the inner casing 12. The thickness of unitizing flange 28 will vary depending upon its length, material characteristics and the expected axial force required for installation of the seal 10. That is, as seen in FIG. 2, unitizing flange 28 is designed to transfer, in the direction of arrow 54, sufficient axial installation force to the confronting engagement surface 56 of bumper 50 to overcome the frictional resistance experienced during installation without substantial bending or yielding.

Unitizing flange 28 should be rigid enough to initially compress the bumper (FIG. 2) and to subsequently shear or slice through it during initial seal rotation (FIG. 3). However, it is preferable to form flange 28 with a reduced cross-section to limit the amount of frictional heat (generated by rubbing contact with bumper 50) transferred from flange 28 to the axial portion 24 of inner casing 12. This reduces the running temperature of the inner casing and results in cooler running and longer operating seal lips 42,48.

As seal 10 is installed, the tip 52 of unitizing flange 28 elastically deforms the engagement surface 56 of bumper 50 and axially compresses the bumper. As tip 56 slightly compresses the annulus of elastomeric bumper material, the tip may become partially embedded therein as shown in FIG. 2. As seen in FIG. 3, upon initial rotation of the seal 10, tip 52 further shears through the remainder of bumper 50 in the manner of a rotating knife blade.

It can be appreciated that after a few rotations, tip 52 of unitizing flange 28 will form a 360° barrier to the ambient as the flange slices a groove and embeds itself within bumper annulus 50.

Obviously numerous modifications and variations of the present invention are possible in light of the above teachings. It is therefore to be understood that within the scope of the appended claims, the invention may be practiced otherwise than as specifically described herein. For example, flange 28 may be formed on the outer casing 14 and the bumper 50 may be formed on the inner casing 12.

What is claimed is:

1. A unitized seal, comprising:
   a first seal casing comprising an axially-extending portion leading to a radially-extending unitizing flange, said unitizing flange having an axially-extending tip portion formed thereon;
   a second seal casing comprising an axially-extending portion leading to a radially-extending flange portion;
   an annular, axially-extending bumper formed of an elastomeric material and carried by said radially-extending flange portion of said second seal casing and confronting said axially-extending tip portion of said first seal casing, said bumper and said tip portion each being dimensioned such that during operation of said unitized seal said elastomeric material of said bumper prevents said axially-extending tip portion of said first seal casing from contacting said second seal casing so as to prevent contact between said first and second seal casings and such that, upon installation and rotation of said seal, said axially-extending tip portion slices into said bumper to form a 360° seal between said tip portion and said bumper; and
   seal lip means mounted to said unitized seal and extending between said first and second seal casings so as to provide a fluid seal therebetween.

2. The unitized seal of claim 1, wherein said tip portion extends axially less than said bumper extends axially.

* * * * *